Figure 1:
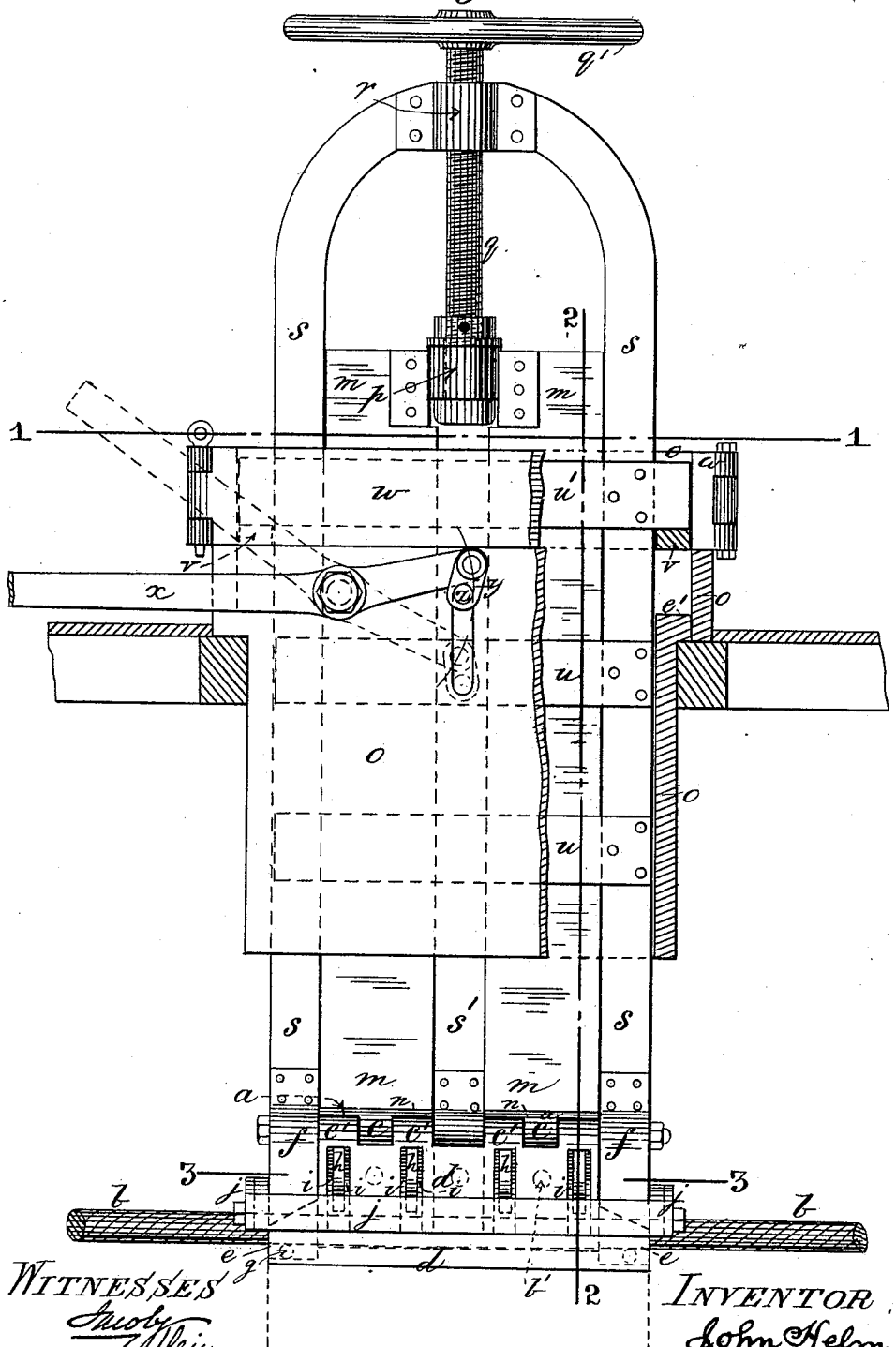

(No Model.) 3 Sheets—Sheet 1.

J. HELM.
GRIP GEAR FOR CABLE STREET RAILROADS.

No. 385,930. Patented July 10, 1888.

WITNESSES
INVENTOR
John Helm,
By Wm. E. Fisse
Attorney.

(No Model.) 3 Sheets—Sheet 2.
J. HELM.
GRIP GEAR FOR CABLE STREET RAILROADS.

No. 385,930. Patented July 10, 1888.

WITNESSES,
INVENTOR.
John Helm,
By Wm. E. Fiese,
Attorney.

(No Model.) 3 Sheets—Sheet 3.
J. HELM.
GRIP GEAR FOR CABLE STREET RAILROADS.
No. 385,930. Patented July 10, 1888.
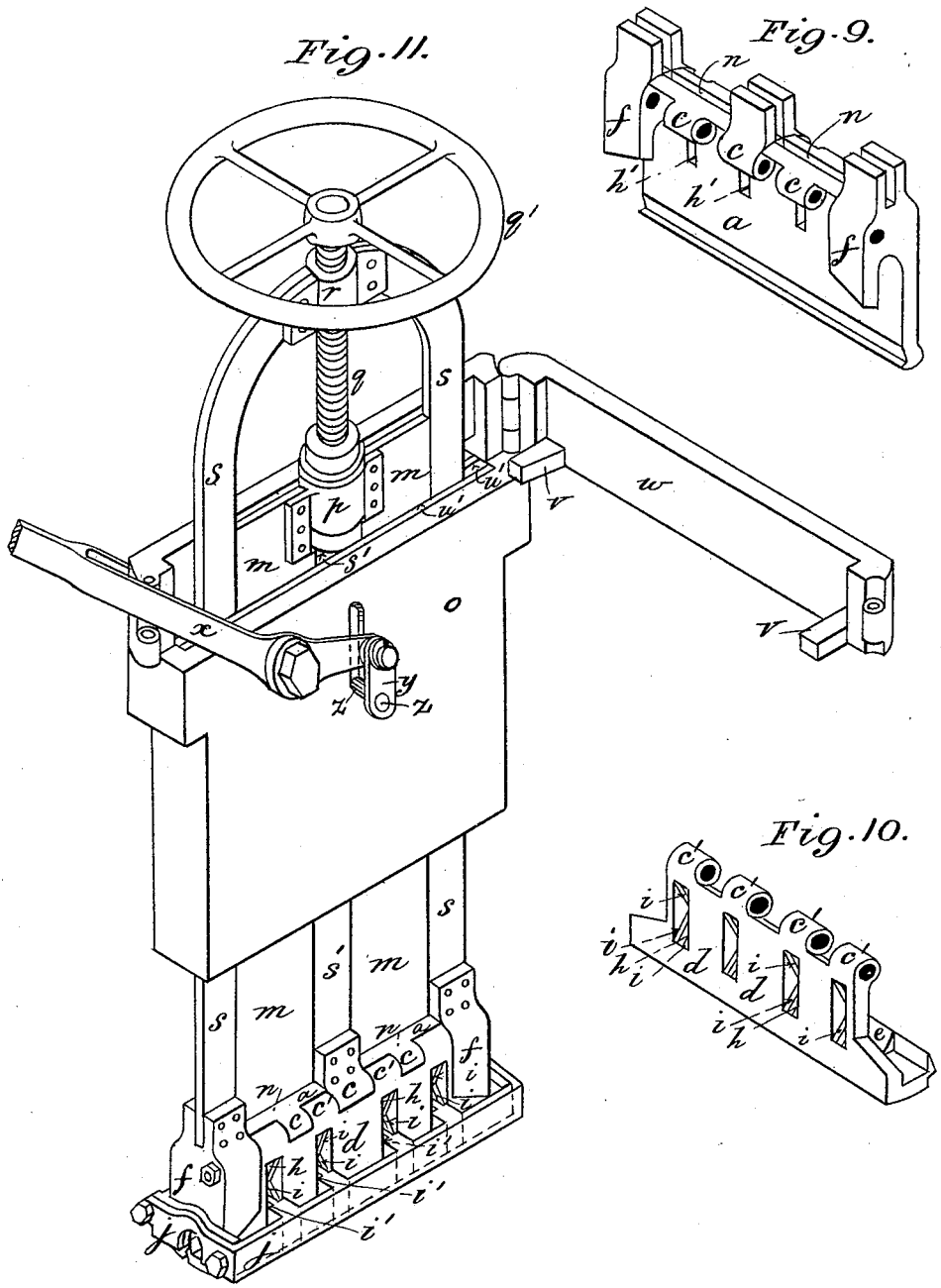
WITNESSES
INVENTOR,
John Helm.
By Wm. E. Fisse,
Attorney.

UNITED STATES PATENT OFFICE.

JOHN HELM, OF OMAHA, NEBRASKA, ASSIGNOR TO LOUIS HELM, OF ST. LOUIS, MISSOURI.

GRIP-GEAR FOR CABLE STREET-RAILROADS.

SPECIFICATION forming part of Letters Patent No. 385,930, dated July 10, 1888.

Application filed March 15, 1888. Serial No. 267,214. (No model.)

*To all whom it may concern:*

Be it known that I, JOHN HELM, a citizen of the United States, residing at Omaha, in the county of Douglas, State of Nebraska, have invented certain new and useful Improvements in Grip-Gears for Cable Street-Railroads, of which the following is a full, clear, and exact description.

My invention relates to improvements in the grip mechanism of cable roads, and has for its object to obtain a firm and positive grip on the cable and to enable the cable to be dropped clear of the grip and recovered thereby in case of a crossing cable or otherwise when required.

It consists in the combination of a fixed jaw and a swing-jaw hinged together, and supporting between them the cable under ordinary conditions of running. Surrounding the jaws is a rectangular-shaped ring or yoke, the opposite sides of which are connected by specially-shaped cross-bars passing through correspondingly-shaped slots in the sides of the jaws and through the lower ends of upright sliding bars, the said ends being located between the jaws and formed with a concave or saddle-shaped groove to fit the upper surface of the cable. The sliding bars pass upward through slots in the fixed jaw, and are connected above the floor of the car by the swivel-joint piece of the lower end of a screw, which works through a nut connecting the upper ends of vertical side bars carrying the fixed jaw, and supported by the casing of the grip-frame, the whole operating so that on rotating the screw in one direction the sliding bars are lowered with the yoke, which thereby closes the swinging jaw upon the fixed jaw and intermediate inlying cable, the saddle-shaped ends of the sliding bars at the same time being lowered upon and firmly gripping the cable against the concave lower portion of the swing-jaw. On turning the screw in the other direction the sliding bars and yoke are raised and the swing-jaw thrown outward from the fixed jaw by springs, so as to release the grip from the cable.

For retaining the grip at its normal level for gripping and releasing the cable, the grip-frame is supported on lugs which project from the inside of a door in the casing surrounding the frame; but when the cable has been dropped for avoiding a crossing cable, or other cause, and it is again required to recover the cable, the door of the casing is swung open, and thereby removes the lugs from beneath the grip-frame, which allows the latter to be lowered by a lever to the level of the cable, which can then be seized by the grip and the whole again raised by the lever to the normal level.

Figure 2:
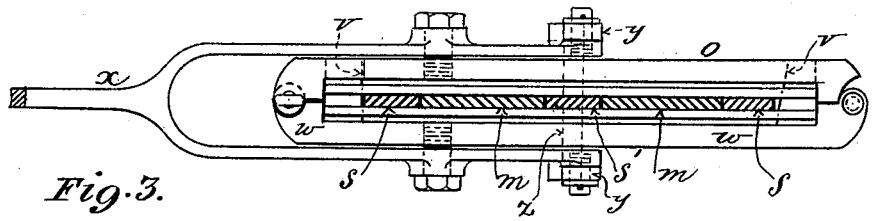
Figure 3:
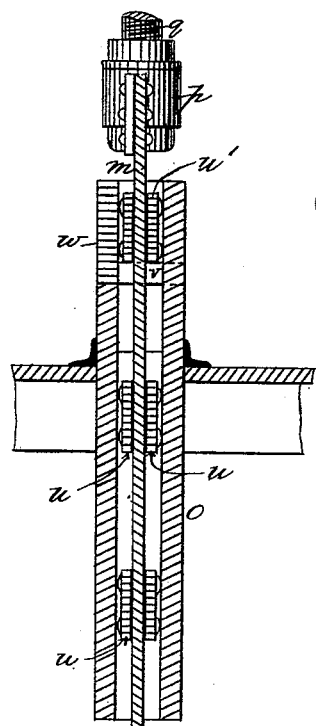
Figure 4:
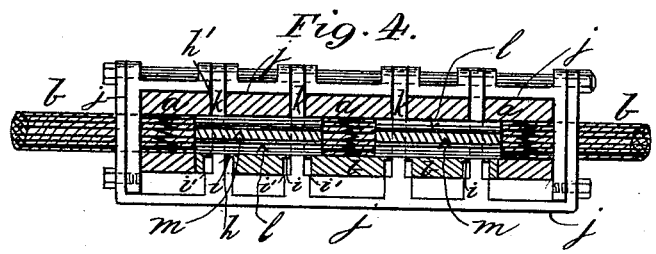
Figure 5:
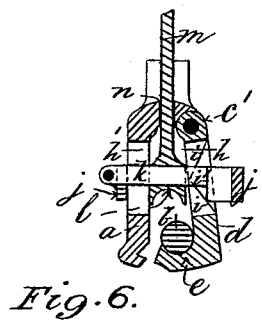
Figure 8:
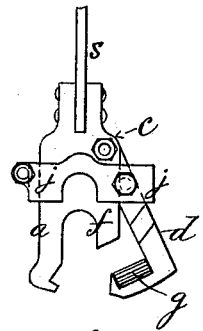
Figure 6:
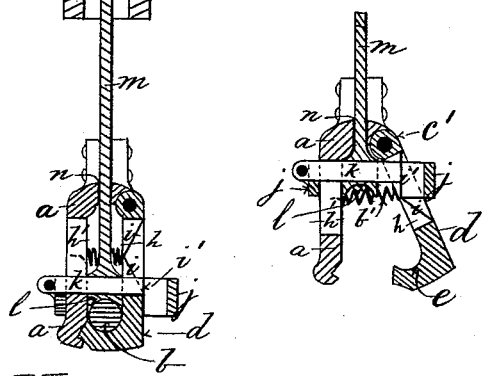
Figure 7:
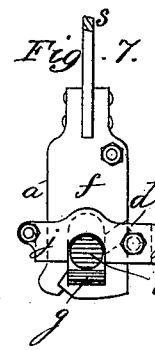

In the accompanying drawings, Figure 1 represents a side elevation, broken away, of my improved grip-gear when gripping the cable; Fig. 2, a sectional plan thereof on line 1 1 in Fig. 1; Fig. 3, a sectional elevation on line 2 2 in Fig. 1; Fig. 4, a sectional plan through grip on line 3 3 in Fig. 1; Fig. 5, a section through grip following line 2 2 in Fig. 1, showing grip released from cable; Fig. 6, a similar view showing grip fully open; Figs. 7 and 8, end views of the grip when closed and fully open, respectively; Fig. 9, a perspective view taken on the inside of the fixed jaw; Fig. 10, a similar view on the outside of the swing-jaw of the grip, and Fig. 11 a perspective view taken at one side of the grip-gear when lowered in its casing for seizing the dropped cable.

Like letters of reference denote like parts in all the figures.

My improved grip is composed of an upright fixed jaw, $a$, of suitable length and height and located at one side of the cable $b$. The jaw $a$ is arched over at top from one side, where it is formed with overhanging lugs $c$, to which the swing-jaw $d$ is hinged by corresponding lugs, $c'$.

The lower portion of the swing-jaw $d$ is hook-shaped toward the fixed jaw $a$, the upper surface of this hooked portion $e$ being concave to fit the lower surface of the cable $b$. The ends $f$ of the fixed jaw $a$ project therefrom at right angles, and are solid except at their lower portions, through which the cable $b$ passes, and the ends of the swing-jaw $d$ are beveled or shaped to fit the corresponding parts of the ends $f$ of the fixed jaw $a$, the whole being so constructed and arranged that when the fixed and swing jaws $a$ and $d$ come together on their hinge the nose or extremity of the hooked portion $e$ of the swing-jaw $d$ closes against the lower inside portion of the fixed jaw $a$, leaving space between the entire length of the jaws $a$ and $d$, through which space the cable $b$, bearing on the concavity in the hooked portion $e$ of the swing-jaw $d$, normally runs. If desired, for avoiding frictional wear on the cable $b$, I may substitute for that part of the concave bearing-surface $e$ at the ends $f$ of the swing-jaw $d$ friction-roller $g$, (see Figs. 7 and 8,) over which the cable $b$ may run.

Through the jaws $a$ and $d$, from side to side and opposite to each other, are formed, respectively, vertical slots $h\ h'$, at suitable distances apart, the sides of the slots $h$ through the swing-jaw $d$ being recessed at their outer ends, so as to form ledges $i$, which are inclined triangle-wise from the top and bottom outer edges, respectively, of the slots $h$ at such an angle as to meet in line with the horizontal center of the slots $h$ on the inside of the swing-jaw $d$.

Surrounding and capable of sliding on the sides and ends of the hinged jaws $a$ and $d$ is a rectangular-shaped ring or yoke, $j$, the opposite sides of which are connected to each other by cross-bars $k$, which are passed through the slots $h\ h'$ of the jaws $a\ d$, and through the intermediate lower ends, $l$, of upright sliding bars $m$, said ends being concave or saddle-shaped corresponding with the upper surface of the cable $b$. The ends of the cross-bars $k$, in front of the inclined ledges $i$ of the slots $h$, are enlarged or formed with shoulders $i'$, which correspond with and ride or bear upon the ledges $i$ in certain positions of the swing-jaw $d$, as hereinafter more particularly explained.

The sliding bars $m$ pass vertically upward from their lower ends through slots $n$ in the top of the fixed jaw $a$ and through the casing $o$ of the grip-frame to a suitable height above the floor of the car, where they are attached transversely to a connecting-piece, $p$, in which is swiveled the lower end of a screw, $q$, extending vertically upward and working through a nut, $r$, secured to the upper ends of two vertical side bars, $s$, which extend downward through the casing $o$, and are attached at their lower ends to the fixed jaw $a$, for supporting the latter in its fixed position.

The upright side bars, $s$, are arranged parallel and in the same plane flatwise with the intermediate sliding bars, $m$, and with a central vertical stiffening-bar, $s'$, located between the sliding bars $m$ and attached at its lower end to the fixed jaw $a$, as shown. The two side bars, $s$, and central bar, $s'$, are braced together transversely by horizontal bars $u\ u'$, which are riveted or otherwise secured to the flat sides of the bars $s\ s'$ on each side at suitable distances apart, and the upright bars $m$ slide vertically between and are guided by the respective bars $s\ s'\ u\ u'$.

The upper cross-bars, $u'$, which, with the bars $s\ s'$ and $u$, constitute the grip-frame, project at each end somewhat beyond the side bars, $s$, these projecting ends resting, when the grip is at its normal level for gripping the cable, as shown in Figs. 1, 2, 3, and 4, on lugs or brackets $v$, which project from the inside of a hinged door, $w$, closing one side of the upper part of the casing $o$. To the sides of the latter is fulcrumed a forked lever, $x$, the forked arms of which are coupled at their ends by links $y$ to a bar, $z$, which passes through vertical slots in the sides of the casing $o$ and through the body of the grip-frame, to which it is secured. The other arm of the lever $x$ extends into the car and serves as a handle.

Between the jaws $a$ and $d$ of the grip are located springs $b'$, which normally tend to force the swing-jaw $d$ outwardly on its hinge away from the fixed jaw $a$.

In the operation of my invention, the various parts being in such relative positions that the grip, with its frame, is at the normal level for gripping the cable $b$, which is running over the concave bed $e$ and rollers $g$ in the swing-jaw $d$, the latter being in the position shown in Fig. 5, on rotating the screw $q$ by its handle $q'$ in one direction, the sliding bars $m$ will be thereby lowered, and, carrying with them the yoke $j$, the shoulders $i'$ on the cross-bars $k$ will ride over the lower inclined ledges, $i$, of the slots $h$, and so constrain the swing-jaw $d$ toward the fixed jaw $a$ until the shoulders $i'$ reach the vertical outer surface of the swing-jaw $d$, when the latter will be fully closed against the fixed jaw $a$, as seen in Figs. 1, 3, and 7, and compress the spring $b'$. Simultaneously the concave or saddle-shaped lower ends of the upright sliding bars $m$ are lowered upon and firmly grip the cable $b$ against its concave bearing-surface $e$ in the bottom of the swing-jaw $d$. On rotating the screw $q$ in the opposite direction the lower ends of the sliding bars $m$ will be raised from the cable $b$, and the yoke $j$ being also raised, its shoulders $i'$ will leave the vertical surface of the swing-jaw $d$, and, entering the depressions formed by the inclined ledges of the slots $h$, thereby allow the swing-jaw $d$ to be thrown outward on its hinge by the springs $b'$ into its original position, as seen in Fig. 5, or so as to release the grip from the cable $b$. When it is required to drop the cable $b$ clear of the grip, the sliding bars $m$ and yoke $j$ are further raised by the screw $q$, so as to allow the swing-jaw $d$ to be forced by the springs $b'$ into the position shown in Figs. 6 and 8, when the cable $b$ will drop from its bearing in the swing-jaw $d$. For recovering the cable $b$ after being dropped, as described, the door $w$ of the casing $o$, surrounding the grip-frame, is swung open on its hinge, which removes the lugs or brackets $v$ from beneath the projecting ends of the upper cross-bars, $u'$, of the grip-frame, when the latter can then be lowered with the entire mechanism by the lever $x$, so that the grip is brought to the level of the cable $b$, or into the position shown in Fig. 11 and by dotted lines at the lower part of Fig. 1, in which position the grip-frame is supported on the recessed portion $e'$ of the casing $o$ until the cable $b$ has been seized by the grip, when the entire mechanism is raised by the lever $x$ to its normal level and retained thereat by closing the door $w$, as before.

I claim—

1. In a cable-road grip-gear, the combination of a fixed jaw, $a$, carried by grip-frame on car, swing-jaw $d$, hinged to fixed jaw $a$, slots $h\ h'$, formed through said jaws and having recesses $i$, yoke $j$, surrounding said jaws and formed with cross-bars $k$, having shoulders $i'$, with lower ends, $l$, of sliding bars $m$, and springs $b'$, substantially as shown, and for the purpose described.

2. The combination of vertical side bars, $s$, carrying fixed jaw $a$ and connected together at their upper ends above the floor of car, and intermediate upright sliding bars, $m$, carrying yoke $j$, and connected together at their upper ends with operating-screw $q$ and hinged jaw $d$, substantially as shown, and for the purpose described.

3. The combination of vertical side bars, $s$, carrying fixed jaw $a$ and connected together at their upper ends, and intermediate upright sliding bars, $m$, carrying yoke $j$ and connected together at their upper ends with operating-screw $q$, casing $o$, and hinged jaw $d$, substantially as shown, and for the purpose described.

4. The combination of vertical side bars, $s$, carrying fixed jaw $a$ and connected together at their upper ends by cross-bars $u\ u'$, central upright bar, $s'$, secured to said cross-bars and to fixed jaw $a$, and intermediate upright sliding bars, $m$, carrying yoke $j$ and connected together at their upper ends with operating-screw $q$, hinged jaw $d$, lugs or brackets $v$, projecting from door $w$ of casing $o$, lever $x$, links $y$, and bar $z$, secured to grip-frame, substantially as shown, and for the purpose described.

JOHN HELM.

Witnesses:
S. F. MILLIRON,
W. E. L. PEARCE.